Aug. 17, 1937.   C. WIEGAND   2,090,089
MEANS FOR INFLATING ROTATING TIRES
Filed Aug. 27, 1935   3 Sheets-Sheet 1

INVENTOR
*Carl Wiegand*
BY
*Robert Rockwell*
ATTORNEY

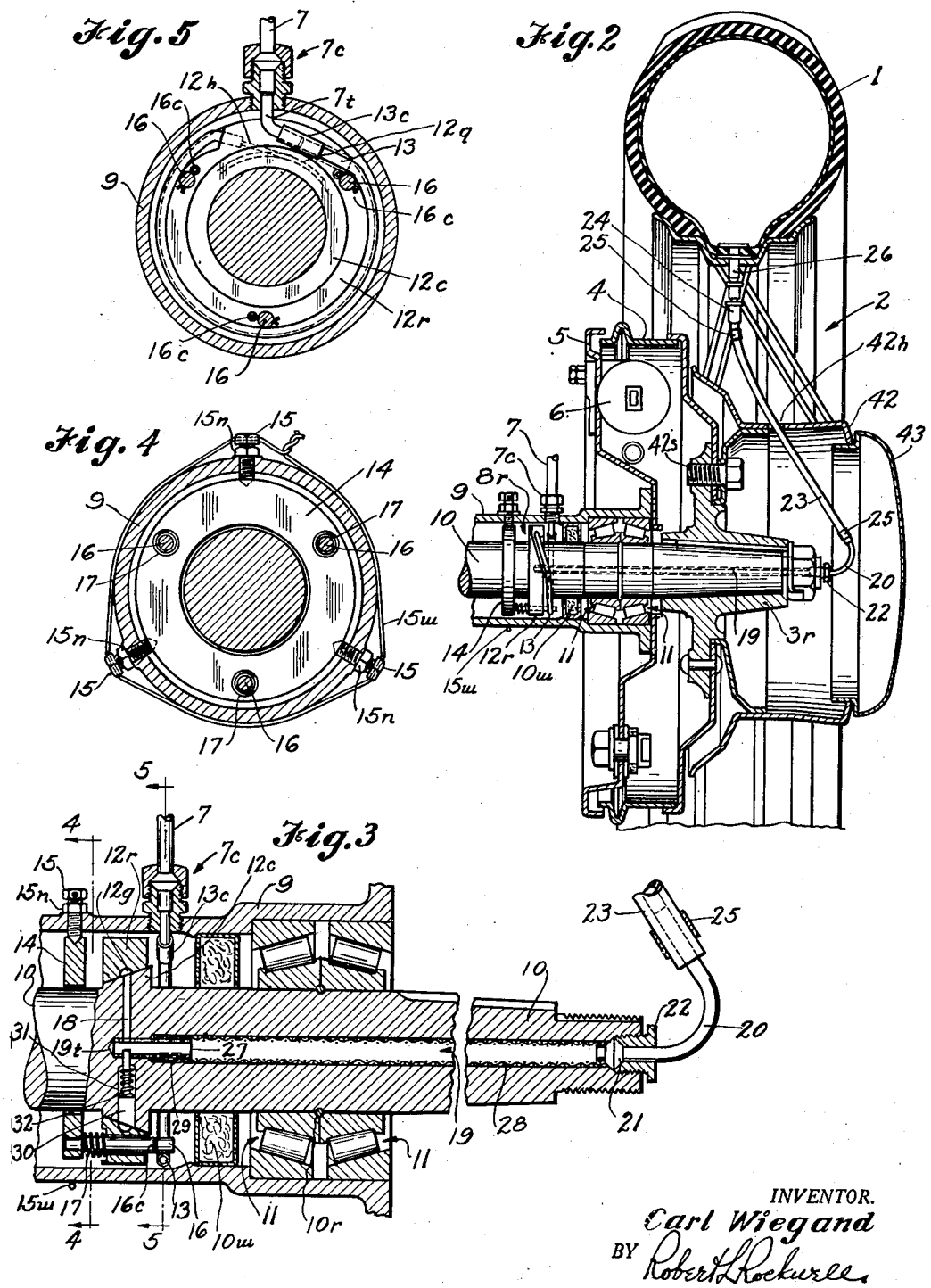

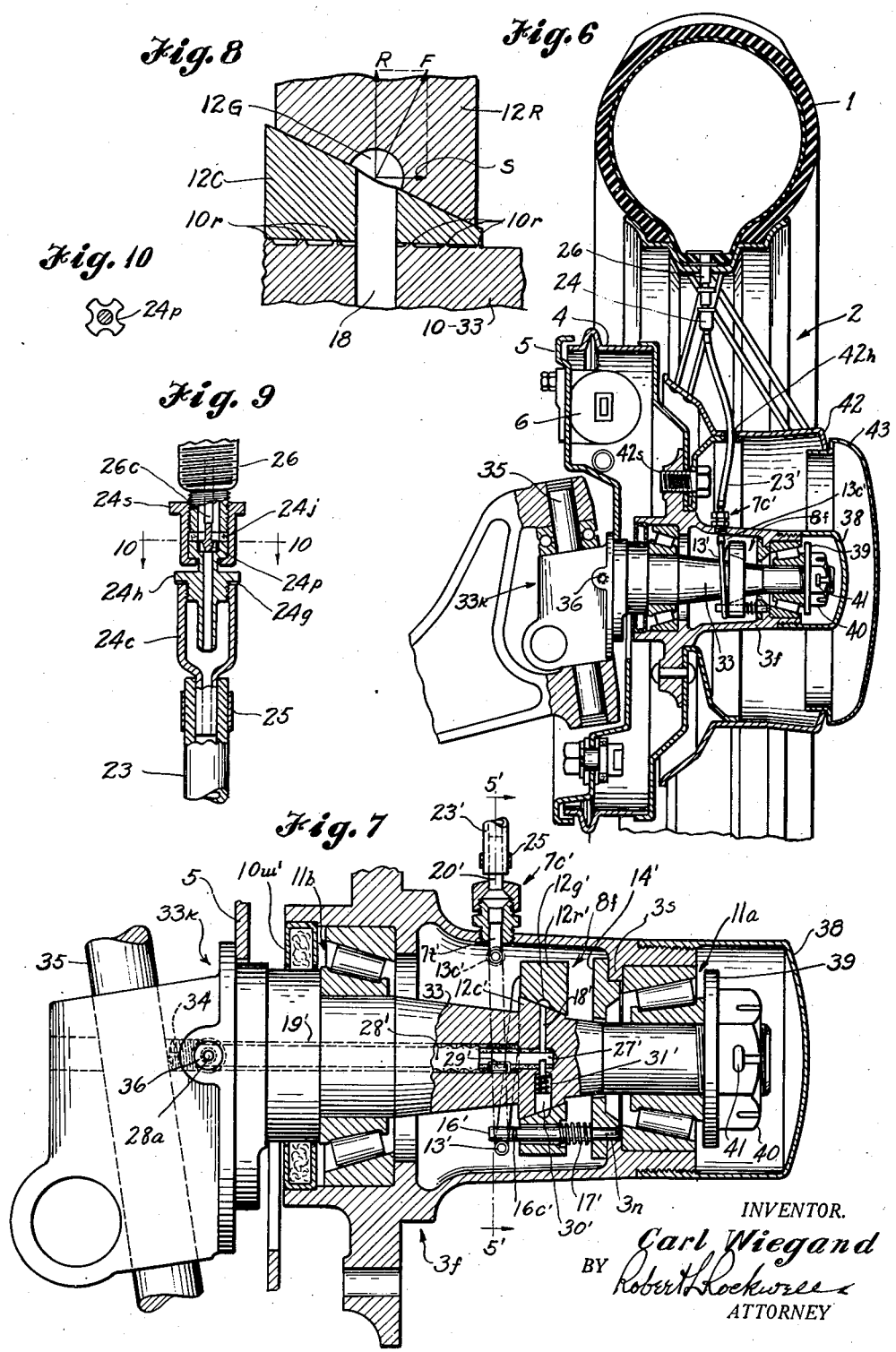

Patented Aug. 17, 1937

2,090,089

UNITED STATES PATENT OFFICE 2,090,089

MEANS FOR INFLATING ROTATING TIRES

Carl Wiegand, Seattle, Wash.

Application August 27, 1935, Serial No. 38,135

11 Claims. (Cl. 152—11)

This invention relates to improvements in tire inflation systems in general, and in particular to rotary connectors employed to join the relatively stationary and rotating portions of the tubular air leads of said systems used to vary the air pressure in the tires of a vehicle while the same is moving or stationary.

The device is adapted to be installed within and protected by the rear axle or front wheel hub housings of automotive vehicles. Each device is comprised of a so-called anchor member fixedly secured within the enclosing housing; a saddle ring member having an interior tapered surface mounted on said anchor member and free to slide longitudinally into relative rotational engagement with a conical member on the axle to form therewith, medially of their engaged tapered surfaces, an annular chamber that provides connection for the relatively stationary and revolving portions of the air lead connected to the tire; suitable resilient means used to yieldingly force the said saddle ring into continual engagement with said conical element; and an oil reservoir and wick feed which provide means for lubricating the engaged surfaces on either side of the said annular chamber.

No packing is required between the relatively revolvable engaged tapered surfaces. The tire inflating fluid forces the film of lubricant applied by said wick feed outwardly to both lubricate and seal the remaining width of said surfaces. The lubricating film is continually replenished with oil drawn from a large and readily fillable oil reservoir provided within the axle of the wheel.

An object of the invention is to provide improved means of the class described that is simple and compact in construction and reliable in operation.

Another object is to provide a device of the kind described that requires no packing, is automatically and reliably lubricated, and is self adjusting to compensate for changes in temperature and wear.

A further object is to provide a device of the kind described that can be installed within and protected by the rear axle and front wheel hub housings of automotive vehicles.

A still further object is to provide rotary air line connector means that permit the convenient removal and replacement of the wheels without disturbing the adjustment of said rotary connector parts.

Other objects and advantages will be apparent to those skilled in the art from the following detailed description of a preferred form of the invention, which consists of certain parts and combination of parts, hereinafter described, illustrated in the accompanying drawings and embraced in the appended claims.

In the drawings:

Figure 2 is a medial sectional elevation on a portion of a rear wheel showing the positioning of the mechanism comprising the air line connection between the tire and the relatively stationary tubular connection to the control system.

Figure 3 is a similar view of the outer end of the rear axle housing and drive shaft to a larger scale, with a portion of the axle, integral cone, and other elements of the rotary air line connection in section.

Figure 4 is a section on broken line 4—4 of Figure 3, showing one means for positioning the anchor ring.

Figure 5 is a section on broken line 5—5 of Figure 3, showing the preferred method of connecting the air line lead with the annular groove in the saddle ring, and applies also to the section on broken line 5'—5' of Figure 7.

Figure 6 is a medial sectional elevation of a portion of a front wheel showing the mechanism comprising the air line connection between the tire and the front wheel spindle.

Figure 7 is a similar view of the front wheel hub to a larger scale with a portion of the spindle the integral cone and saddle ring of the rotary air line connection in section.

Figure 8 is a section through a substitute cone element construction and fragmentary sections of the associated parts to a still larger scale, also a diagram of the resolution of force due to the air pressure in the annular groove of the saddle ring.

Fig. 9 is a larger scale medial sectional elevation of the combination valve stem connector and lubricant separator at the end of the flexible tubing shown in Figures 2 and 6.

Figure 10 is a plan of the pin insert for the valve stem connector, with the pin in section as at broken line 10—10 of Figure 9 to still larger scale.

Figure 1:
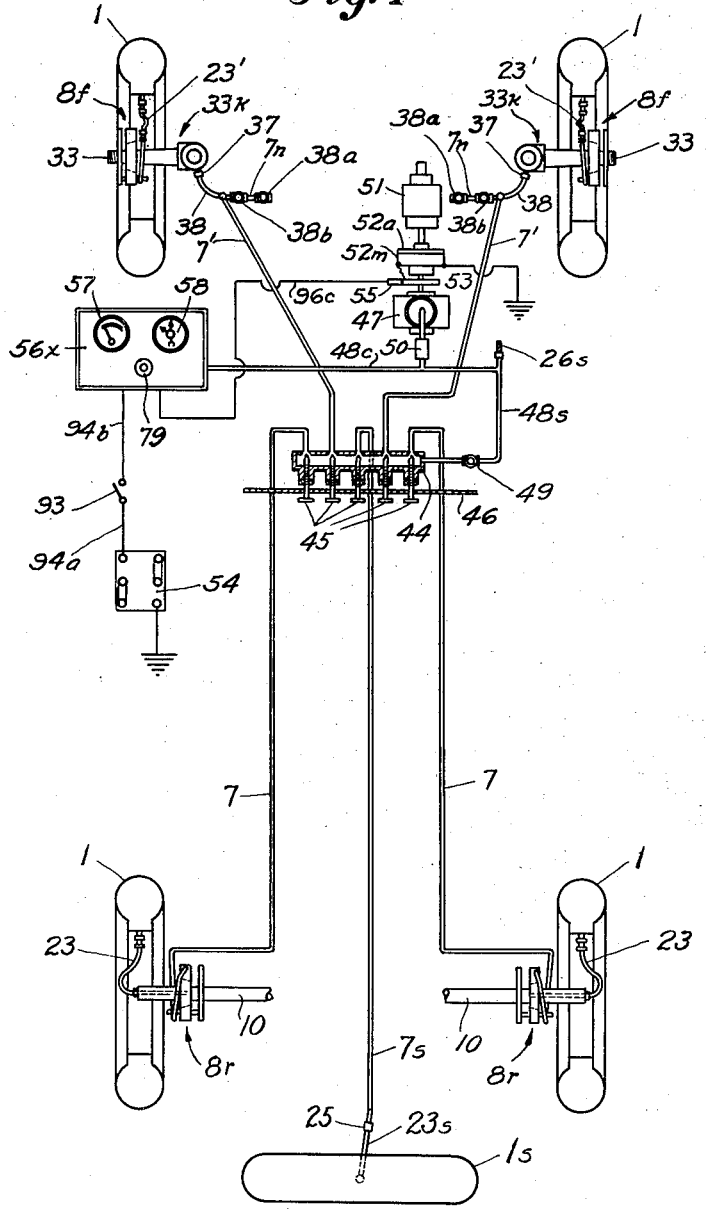
Figure 1 is a diagram indicating the relative positions of the several mechanism elements and pneumatic tires interconnected by tubing and electric wiring for varying the fluid pressure in said tires through the intermediacy of my rotary air lead connector, as applied to a conventional automotive vehicle.

Like reference numerals are used to indicate like parts throughout the drawings wherein I refers to the tire casings of an automotive vehicle equipped with my invention, 2 are the removable wheels on which said tires are mounted, 3r is a rear wheel hub and 3f is a front wheel hub, 4 are the brake drums, and 5 are the brake supports which carry hydraulic brake cylinders 6.

Air pressure system

A valve manifold consisting of a hollow body 44 in which a plurality of valve elements 45 are mounted, may be positioned behind the instrument panel 46 with the valve stems passing through apertures therefor in said panel so the knurled heads of said valve stems are within easy reach of the driver. A separate valve element may be provided for each tubular air lead connected to said manifold as shown in Figure 1. By means of the aforesaid valves the flow of air in rear wheel conduit leads 7, front wheel conduit leads 7′ and conduit leads 7s to flexible tubing 23s and spare tire 1s can be controlled quickly an easily, so the facilities of the system may be utilized to the best advantage.

The manifold body chamber is connected to a source of fluid under pressure 47 through a run of tubing 48s containing a shut-off valve 49 and a check valve 50. When air brakes are not used, I prefer to employ an air compressor as my fluid supply means as shown in Figure 1. Connection is made also to the air pressure control device 56x by means of tubing 48c, which therein connects to pressure gauge 58. The mechanism of said control device is illustrated and described in my copending application, Serial No. 148,422, filed June 15, 1937, the same being a continuation in part of this application. A modified tire valve and stem 26s may be provided in the run of tubing 48s to facilitate connection with service air leads for emergency inflation of the tires, testing or other purposes. Air compressor 47 may be driven mechanically by the projecting end of the shaft of the usual electric generator 51, which in turn is driven by the vehicle's engine, not shown.

To complete the driving connection between the compressor and generator shafts, I prefer to use an electro-magnet clutch having an aramature portion 52a and an electro-magnet body portion 52m. One end of the winding of said clutch is "grounded" to said body portion and through it to the frame of the vehicle, and the other end is connected to an insulated slip ring 53 fixedly mounted on the clutch shaft. The vehicle's metal frame (not shown) conducts the current from the "grounded" end of said winding to the "grounded" terminal of the usual storage battery 54, which may be charged by generator 51. The electromagnet clutch circuit is completed to slip ring 53 through conductor 94a, switch 93, conductor 94b, current flow indicator 57 and the relay (not shown) of said control device, conductor 96c and brush 55.

It will be apparent that so long as the engine is running the air compressor may be started at any time by energizing the electro-magnet clutch. Because of the high inductance of the clutch winding circuit, the current builds up slowly and the grip of the clutch is exerted gradually, thus enabling the air compressor to be started without undue jerk. Obviously the air compressor may be stopped by simply opening the electromagnet clutch circuit at any point.

Rear wheel conduit lead rotary connector

Referring to Figures 1 to 5 inclusive, connection is made between tubular conduit leads 7 of the tire pressure control system and rear wheel tires by means of rear wheel conduit lead rotary connectors 8r, which preferably are positioned within and near the outer ends 9 of the rear axle housing. As shown best in Figures 2 and 3, each rear axle 10 is rotatively supported within said rear axle housing by means of taper roller bearings 11. At the time of its manufacture said rear axles may each be provided with a conical enlargement 12c the lateral surface of which is machined, ground and lapped to provide a smooth tapered surface of high geometrical accuracy. An annulus member termed a saddle member 12r that may be made of a softer material such as graphite bronze, has its inner surface machined and lapped separately to fit on conical enlargement 12c, and is then lapped in place to provide an air tight joint on either side of annular groove 12g. Conduit connection with said groove 12g is provided by means of aperture 12h in member 12r, shown best in Figure 5, enlarged at its outer end to receive one end of circularly formed tube 13, which is fixedly secured to said saddle member as by brazing.

Saddle ring 12r is maintained in position on its companion conical member by means of an anchor ring 14 which may be adjustably and removably secured to housing 9 by means of a plurality of set screws 15, as shown clearly in Figure 4. A plurality of pins 16, fixedly secured to the anchor ring, are adapted to extend through apertures in the saddle ring as shown in detail in Figures 3, 4, and 5. These pins prevent the rotation of the saddle ring, but permit it to be urged continually in an axial direction against the tapered surface of cone 12c by means of helical compression springs 17 carried by said pins.

The conduit connection from groove 12g to tire 1 is completed by means of a radially disposed aperture 18 that connects with an axially disposed longitudinal aperture 19 in rear axle 10, a length of rigid tubing 20, tapered compression ring 21, ferrule 22, flexible tubing 23, lubricant separator 24, clamp rings 25 and valve stem 26, as shown clearly in Figures 2, 3, and 9.

Aperture 19 preferably has an inner terminal length 19t of smaller diameter to receive a felt terminal tube 27 to which is affixed a larger tube of wick-like material 28 by means of staple 29. The combination is saturated with a suitable lubricant and forms a reservoir to be drawn from for the lubrication of the relatively revolvable surfaces of the rotary connector by means of felt wick 30. As may be seen clearly in Figure 3, said wick is forced outwardly in radially disposed aperture 31 in conical enlargement 12c by means of helical compression spring 32 so its outer end bears against the tapered bearing surface of saddle ring 12r on either side of groove 12g. The inner end portion of said wick is a tight fit in an aperture provided therefor in felt terminal tube 27, hence the lubricant is fed outwardly from reservoir wick 28 to maintain a thin film of lubricant between cone 12c and ring 12r, the air pressure in groove 12g being effective to force said lubricant outwardly to cover the full width of the engaged and relatively revolvable surfaces. The larger diameter of aperture 19, in which reservoir wick 28 is positioned, retains the lubricant when subjected to centrifugal force due to the rotation of the rear axle, but does not prevent its flow longitudinally through the felt terminal tube to feed wick 30. An aperture in terminal tube 27 opposite aperture 18 assures a passage for the flow of air to or from the tire.

To assemble the rear wheel mechanism with the rear axle and its bearings and oil washer 10w removed, set screws 15 are screwed out far enough to clear anchor ring 14, then tubular connector fitting 7c is screwed into the threaded hole provided therefor in rear axle housing 9 with the affixed curved tubular extension 7t positioned to meet the free end of tube 13 on which connector sleeve 13c is forced back to the position shown by the dotted lines in Figure 5. Anchor ring 14 and saddle ring 12r are assembled with springs 17 forcing said saddle ring against cotter pins 16c and tube 13 encircling the ends of pins 16. This sub-assembly is then inserted into the open end of rear axle housing 9 on any suitable guide tool (not shown) that will fit accurately within the portion of said housing machined to receive bearings 11, thus positioning the anchor ring coaxially of the running position of axle 10.

Set screws 15 and lock nuts 15n then may be tightened and adjusted until the guide tool may be withdrawn freely, after which locking wire 15w is inserted through apertures provided therefor in the heads of said set screws, as shown in Figure 4.

The end of tube 13 should be adjusted next until its free end is positioned opposite and adjacent the end of tubular extension 7t; then connecting sleeve 13c is slid into the position shown, and a small flame and solder are applied to form an air tight and mechanically strong connection. The usual splined end of rear axle 10 then is inserted through ring 14 without touching the highly finished interior surface of saddle ring 12r. Ring 14 serves as a guide while axle 10 is being pushed through to establish driving connection with the well known differential gearing, not shown. Oil washer 10w is inserted next, then the inner roller bearing assembly, snap ring 10r, and outer roller bearing assembly in the order named. The arrangement and dimensions of the several parts are such that when axle 10 is forced inwardly to its operating position, conical member 12c engages saddle ring 12r and forces it back on pins 16 away from cotter pins 16c.

The assembly of wheel hub 3r, wheel 2 and other parts as shown in Figure 2, will be apparent to those skilled in the art. Obviously the mechanism can be disassembled in reverse order.

*Front wheel conduit lead rotary connector*

Referring to Figures 6 and 7 it will be seen that the conduit lead rotary connector 8f for the front wheels although smaller is identical in principle to the conduit lead rotary connector 8r for the rear wheels. Corresponding parts have corresponding but prime or otherwise characterized numerals of reference for the front wheel. The fact that the front wheel and hub 3f rotate about axle 33 of steering knuckle 33k on tapered roller bearings 11a and 11b, necessitates securing anchor ring 14' within said hub. This may be done by machining shoulder 3s and anchor ring 14' so the latter is a light press fit within the bore of said shoulder, which is notched to receive the projecting small end of one of pins 16', the ends of the other pins being machined flush with the anchor ring before the third pin is pressed into position and riveted. This provides a key connection to assure rotation of the anchor ring with the wheel hub, which serves as a housing to protect the parts of the air line rotary connector, as may be seen in Figure 7. From this it will be apparent that conical enlargement 12c' and axle 33 do not rotate; but anchor ring 14', saddle ring 12r' and the assembled associated parts rotate with hub 3f. Springs 17' urge the saddle ring onto the taper of the conical member, thus maintaining an air-tight rotary connection between these two all-important elements, the same as in the rear wheel mechanism.

The lubricant reservoir in this case may be formed by drilling the steering knuckle at the axis of the axle to receive felt terminal tube 27' and reservoir wick 28', and tapping the end to receive threaded plug 34 before inserting the steering knuckle pivot rod 35. Terminal tube 27', feed wick 30' and spring 31' are similar in construction and operation to the like parts for the rear wheel mechanism, and assure the proper lubrication of the relatively revolvable surfaces of the conical member and saddle ring as hereinbefore described.

A threaded aperture 36 in steering knuckle 33k connecting with the lubricant reservoir is adapted to receive standard connector fitting 37 and a length of flexible tubing 38, which in turn connects with tubular conduit lead 1' as shown in Figure 1 to allow for the required movement of said steering knuckle. An aperture 28a in reservoir wick 28' opposite aperture 36 assures an unobstructed path for the flow of air.

In this case the conduit connection from the lubricant reservoir to the tire is provided by aperture 18' saddle ring groove 12g', an aperture in the saddle ring similar to 12h of Figure 5, circularly formed tube 13', connector fitting 7c', flexible tubing 23', lubricant separator 24 and valve stem 26.

To assemble the front wheel mechanism with hub 3f removed from axle 33, and with oil washer 10w', bearing 11b and grease cap 38 removed from the hub; first saddle ring 12r', tube 13' and springs 17' are positioned on pins 16' and held in place by cotter pins 16c'. This combination then is inserted through the opening in the large end of hub 3f, and suitable tools are used to force anchor ring 14' into the position shown in Figure 7.

Tubular connector fitting 7c' next may be screwed into position in the hub and the ends of tubular elements 7t' and 13' connected by means of sleeve 13c' as previously explained for the rear wheel assembly. Bearing 11b is inserted next, and then oil washer 10w'. The hub finally is slipped into position on spindle 33, with the central aperture of anchor ring 14' and bearing 11a serving as guides, care being taken not to injure the bearing surface of the saddle ring or conical member.

The usual keyed thrust washer 39, then is adjusted by bearing nut 40 and secured in position by means of cotter pin 41. Bearings 11a and 11b having been greased before positioning the hub on spindle 33, grease cap 38 may be screwed into position to complete the hub assembly. After securing wheel 2 to the hub flange by means of cap screws 42s, the lower end of flexible tubing 23' is passed through hole 42h in wire wheel hub shell 42 and tubular end terminal 20' is secured in connector fitting 7c' in the usual manner. The combination valve stem connector and lubricant separator 24 connected to the other end of said tubing, is then connected to valve stem 26 and the usual hub shell cap 43 is finally snapped into place, to complete the assembly shown in Figure 6.

Substitute conical member

The foregoing description of the air lead connections for the rear and front wheels, assumes that my tire air pressure control system is to be installed at the factory on new cars. When said system is to be installed after the factory work is completed, separate conical members are constructed of tempered steel and shrunk onto the rear axles and steering knuckle axles as substitutes for the integral conical enlargements hereinbefore described.

To assure an air tight joint between the substitute cone element and associated part, I prefer to use the construction illustrated in Figure 8, apertures 18 and 31 being drilled in the cone element 12c before the same is tempered. The rear wheel or steering knuckle axle 10—33 is machined to provide a plurality of circular ridges 10r on either side of the position selected for the aforesaid apertures in the respective axles. Said ridges then are ground to provide a slight taper to fit the taper bore of the substitute conical member, which is ground and lapped separately to provide a highly accurate and smooth surface. The respective axles may next be cooled in ice water and the cone element heated in boiling water. Said cone element is then forced onto the aforesaid ridges as far as it will go and allowed to cool. Apertures 18 and 31 may then be extended by drilling said respective axles to meet the axially disposed aperture for the reservoir wick. Finally the lateral surface of the substitute conical member is ground and lapped, and then the saddle ring is lapped in place as previously described. When this construction is used I find that the relatively soft ridges are gripped securely by the tempered cone element and provide a simple and reliable air tight connection.

It will be apparent to those skilled in the art that as the saddle ring and conical member are moved relative to each other due to the rotation of the wheel, aperture 18 is in connection at all times with the annular groove in the saddle ring, and that the helical springs on the anchor ring pins are continually forcing the saddle ring onto the tapered surface of the conical member. Obviously for any of the constructions described, said annular groove may be placed in the conical member instead of in the saddle member, or both members may have such grooves. In any of these three cases the engagement of the two tapered surfaces of the two relatively revolvable members forms an annular chamber with which connection is made by lateral apertures in each of said members, thereby providing a continuous conduit connection between the relatively stationary and revolving portions of the conduit lead for each wheel.

The pressure of the air in said annular chamber produces a force normal to the lateral surface of the conical member and equal to the lateral area of the cone embraced by said chamber times the air pressure per unit of area.

A diagram of said force and its components is shown in Figure 8. The strength and direction of the force is represented by the length and direction of line F of the diagram for a given air pressure. Said force F may be resolved into two components, one of which R represents the force tending to expand the saddle member, and the other component S represents the force tending to push the saddle member away from the conical member in an axial direction. It will be noted that component S is small compared to either force F or component R. Obviously springs 17 and 17' in each case need exert only sufficient force to balance the small force component S, and enough more to assure an air tight connection between the conical element and saddle member. I have found that a spring force equal to twice the component S produced by the maximum tire air pressure is satisfactory for the conical taper illustrated.

Because of the taper of the automatically lubricated joint and the resiliency of the saddle member springs, my conduit lead rotary connector is self adjusting to compensate for changes in temperature and wear. Since the coefficient of expansion of bronze is greater than that of steel, an increase in temperature increases the relative diameter of the saddle member, but the saddle ring springs then force said saddle ring further onto the tapered surface of the conical member. In like manner any wear is compensated for as it occurs.

As the conical and saddle members cool, the latter contracts at a faster rate than the former, thus causing said saddle member to slip slightly on the well lubricated lateral surface of the conical member and compress the saddle member springs.

Lubricant separator

The combination valve stem connector and lubricant separator, hereinbefore designated in its entirety by reference numeral 24, is an important element of my tire air pressure control system.

As will be seen by reference to Figure 9, a cup-like portion 24c has a tubular end adapted to fit within the end of flexible tubing 23, and has interior threads at its larger end to receive a closure element 24h having a tubular extension adapted to extend downwardly into said cup-like portion at one end and a recessed head portion at its other end. A connector sleeve 24s having interior threads at its head end, may have the opposite end walls forced inwardly under the recessed head portion of element 24h by means of the well known spinning operation, the arrangement being such that sleeve 24s is free to turn on said head portion while being screwed onto valve stem 26.

A pin insert 24p, shown also in Figure 10, is forced into the recess provided therefore in head portion of element 24h, peripheral notches being provided to serve as air passages. The pin portion of this insert is of sufficient length to force valve core 26c upwardly in valve stem 26 and assure the opening of the tire valve when sleeve 24s is fully screwed onto the valve stem. Suitable gaskets 24g and 24j may be used to make airtight joints between the adjacent connecting parts.

Any of the lubricant that may find its way into the flexible tubing will flow along the interior walls thereof because of the various bends, centrifugal force due to the rotation of the tire being effective to accentuate said flow. When the lubricant enters cup-like portion 24c of the lubricant separator, its surface tension causes it to follow the interior wall thereof instead of entering the tubular projection of the closure element, thus effectively preventing the lubricant from entering and injuring the tire.

Any lubricant accumulation in cup 24c is easily removed by stopping off the conduit lead to that particular tire by closing its valve 45, removing the connector from the valve stem of the tire, unscrewing the closure element from the cup, and cleaning their readily accessible interior surfaces.

After this is done and with the rear wheel in the position shown in Figure 2, a specified quantity of liquid lubricant may be poured periodically into cup-like portion 24c and allowed to drain downwardly directly onto the outer end of reservoir wick 28. Any surface film of lubricant in the connecting tubing will of course be caught in the lubricant separator after the same is again assembled and connected to the tire.

Referring to Fig. 1, liquid lubricant for the front wheel reservoir wick may be introduced periodically by simply opening a valve 38a at the upper extremity of a vertically disposed nipple 7n secured to the frame of the car, pouring the specified quantity of liquid into said nipple, closing valve 38a and then opening valve 38b. The arrangement of flexible tubing 38 is such that said liquid will then flow downwardly onto the end of reservoir wick 28', shown in Fig. 7. Valve 38b is then closed also to reduce the chance for air leaks.

While I have illustrated and described my system in a preferred form as applied to an automobile, it will be apparent to those skilled in the art that the combination of coacting elements constituting my invention may be adapted and applied to trucks of various kinds, busses, and other vehicles using pneumatic tires, and that various changes may be made in the details of construction and arrangement of parts without departing from the purpose and intent of said invention within the scope of the appended claims.

What I claim as new and desire to protect by Letters Patent is:

1. In a tire inflation system, means for supplying fluid under pressure, a conduit lead having relatively stationary and revolving portions for connecting said supply means to a tire casing, rotary connector means for joining the said portions of said lead through a medial annular duct formed by the union of engaged and relatively revolving tapered surfaces, and means disposed medially of the width of said engaged surfaces for applying a lubricant between the respective innermost portions of said surfaces and using the outwardly effective pressure of said fluid to distribute said applied lubricant from said innermost portions outwardly between said engaged surfaces.

2. In a tire inflation system, means for supplying fluid under pressure, a conduit lead having relatively stationary and revolving portions for connecting said supply means to a tire casing, a conical member having a lateral aperture terminating medially of its exterior tapered surface and connected to one portion of said lead, a saddle member having an interior tapered surface with a medial annular groove connected to the other portion of said lead and being in relatively revolvable engagement with the exterior surface of said conical member, means for maintaining said revolvable engagement, and wick means for applying a lubricant to the inner edges adjacent said annular groove, whereby the pressure of said fluid in the groove is used to distribute the applied lubricant outwardly between the entire engaged tapered surfaces on either side of said annular groove.

3. In a tire inflation system comprising means for supplying fluid under pressure a conduit lead having relatively stationary and revolving portions for connecting said supply means to a tire casing, and the combination within a housing, of a conical member having an exterior tapered surface, a saddle member having an interior tapered surface adapted to relatively revolvably engage the tapered surface of said conical member and to form therewith medially of their engaged said tapered surfaces an annular chamber, an anchor member fixedly secured within said housing and providing means to prevent relative rotational but to permit relative axial movements between said anchor and saddle members, resilient means forcing said saddle means into engagement with the tapered surface of said conical member, conduit means connecting one portion of said lead to said annular chamber through said saddle member, other conduit means connecting the other portion of said lead to said annular chamber through said conical member, and means for applying a lubricant between the innermost portions of the engaged tapered surfaces.

4. In a tire inflation system comprising means for supplying fluid under pressure, a conduit lead having relatively stationary and revolving portions for connecting said supply means to a tire casing, and the combination within a housing of an axle providing a conical member having conduit means connecting with one portion of said lead, a saddle member in relatively revolvable engagement with the lateral surface of said conical member and providing conduit means connecting with the other portion of said lead and with the conduit means of said conical member, an anchor member fixedly secured within said housing and providing means to prevent relative rotational but to permit relative axial movements between said anchor and saddle members, and resilient means forcing said saddle member into engagement with said conical member.

5. In a tire inflation system comprising means for supplying fluid under presure, a conduit lead having relatively stationary and revolving portions for connecting said supply means to a tire casing, and the combination within a housing, of a conical member having an exterior tapered surface, a saddle member having an interior tapered surface adapted to engage the tapered surface of said conical member and to form therewith medially of their engaged said tapered surfaces an annular chamber, an anchor member fixedly secured to said housing to assure relative rotation between said saddle and conical members, resilient means maintaining the engagement of said tapered surfaces, conduit means connecting a coiled portion of said lead to said annular chamber through said saddle member, other conduit means connecting the other portion of said lead to said annular chamber through said conical member, and means for applying a lubricant between the engaged tapered surfaces.

6. In a tire inflation system, means for supplying fluid under pressure, a conduit lead having relatively stationary and revolving portions for connecting said supply means to the tire casing of a wheel, rotary connector means comprising a conical member fixedly secured to the axle of said wheel and a saddle member having an inner tapered surface in relatively revolvable engagement with the lateral surface of said conical member for joining the said portions of said conduit lead, and means disposed medially of the width of said engaged surfaces for applying a lubricant between their innermost portions.

7. In a tire inflation system, means for supplying fluid under pressure, a conduit lead having relatively stationary and revolving portions for connecting said supply means to the tire casing of a wheel, a conical member providing conduit means connecting with one portion of said lead, a saddle member having an inner tapered surface in relatively revolvable engagement with the lateral surface of said conical member and providing conduit means connecting with the other portion of said lead and with the conduit means of said conical member, anchor means providing axially slidable engagement with said saddle member for maintaining a relatively revolvable relation between said conical member and said saddle member, and resilient means for forcing said saddle member into revolvable engagement with said conical member.

8. The combination claimed in claim 7 in combination with means disposed medially of the width of said engaged surfaces for applying a lubricant between the respective innermost portions of said relatively revolvable engaged surfaces.

9. In a tire inflation system, means for supplying fluid under pressure, a conduit lead having relatively stationary and revolving portions for connecting said supply means to the tire casing of a wheel, a conical member having an exterior tapered surface fixedly secured to the axle of said wheel, a saddle member having an interior tapered surface adapted to relatively revolvably engage the tapered surface of said conical member and to form therewith medially of the engaged said surfaces an annular chamber, conduit means embracing a circularly formed tubing for connecting said annular chamber to one portion of said conduit lead, other conduit means embracing a lateral aperture in said conical member for connecting said annular chamber to the other portion of said conduit lead, an anchor member providing means for axially slidable engagement with said saddle member to prevent relative rotation but to permit relative axial movement between said anchor and saddle members, and resilient means for forcing said saddle member into engagement with the tapered surface of said conical member.

10. In a tire inflation system comprising a conduit lead having relatively stationary and revolving portions for connection with the tire casing of a wheel, and the combination within a housing surrounding the axle of said wheel, of a conical member fixedly secured to said axle and having an exterior tapered surface and providing conduit means connected to one portion of said conduit lead, a saddle member having an interior tapered surface in relatively revolvable engagement with the exterior surface of said conical member and providing conduit means connecting with the other portion of said lead and with the conduit means of said conical member, an anchor member fixedly secured to said housing and providing means for axially slidable engagement with said saddle member to prevent relative rotation but to permit relative axial movement between said anchor and saddle members, resilient means for forcing said saddle member into engagement with the tapered surface of said conical member, an oil reservoir within said axle, and wick means connecting said oil reservoir with the innermost portions of the engaged tapered surfaces of said conical and saddle members.

11. In a tire inflation system comprising means for supplying fluid under pressure, a conduit lead having relatively stationary and revolving portions for connecting said supply means to the tire casing of a wheel, and the combination within the hub of said wheel of an axle providing a conical member having an exterior tapered surface and providing conduit means connected to one portion of said lead, a saddle member having an interior tapered surface in relatively revolvable engagement with the exterior surface of said conical member and providing conduit means connecting with the other portion of said lead and with the conduit means of said conical member, an anchor member fixedly secured to said hub and providing means for axially slidable engagement with said saddle member to prevent relative rotation but to permit relative axial movement between said anchor and saddle members, and resilient means for forcing said saddle member into engagement with the tapered surface of said conical member, the arrangement of said coacting parts within said hub being such that said wheel may be removed and replaced without disturbing said conduit connections.

CARL WIEGAND.